US012596866B2

(12) United States Patent
Hsieh et al.

(10) Patent No.: US 12,596,866 B2
(45) Date of Patent: Apr. 7, 2026

(54) ROUTING METHOD OF PRINTED CIRCUIT BOARD AND ELECTRONIC DEVICE

(71) Applicant: PEGATRON CORPORATION, Taipei City (TW)

(72) Inventors: Yung-Lin Hsieh, Taipei City (TW); Chih-Hung Wang, Taipei City (TW); Yi-Fang Kao, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 624 days.

(21) Appl. No.: 18/164,624

(22) Filed: Feb. 6, 2023

(65) Prior Publication Data

US 2023/0306178 A1 Sep. 28, 2023

Related U.S. Application Data

(60) Provisional application No. 63/323,506, filed on Mar. 25, 2022.

(30) Foreign Application Priority Data

Nov. 18, 2022 (TW) .................................. 111144162

(51) Int. Cl.
G06F 30/394 (2020.01)
G06F 115/12 (2020.01)

(52) U.S. Cl.
CPC ........ G06F 30/394 (2020.01); *G06F 2115/12* (2020.01)

(58) Field of Classification Search
CPC ........................... G06F 30/394; G06F 2115/12
See application file for complete search history.

(56) References Cited

U.S. PATENT DOCUMENTS

| | | | | |
|---|---|---|---|---|
| 8,793,643 | B2 * | 7/2014 | Nishio | G06F 30/394 |
| | | | | 716/137 |
| 8,930,869 | B2 * | 1/2015 | Ohtsuka | G06F 30/394 |
| | | | | 716/137 |
| 9,507,905 | B2 * | 11/2016 | Hiratsuka | G06F 30/398 |
| 10,325,052 | B1 * | 6/2019 | Fouassier | G06F 30/394 |
| 10,643,020 | B1 | 5/2020 | Kukal et al. | |

(Continued)

FOREIGN PATENT DOCUMENTS

| | | |
|---|---|---|
| CN | 100471365 | 3/2009 |
| CN | 105188259 | 12/2017 |

(Continued)

*Primary Examiner* — Nha T Nguyen
(74) *Attorney, Agent, or Firm* — J.C. PATENTS

(57) ABSTRACT

A routing method of a printed circuit board and an electronic device are disclosed. The routing method includes: obtaining design information which includes a plurality of element pins of at least one circuit element and a plurality of electrical pins on the printed circuit board; arranging a plurality of bus paths according to the design information, wherein each of the bus paths is adapted for arranging a plurality of wirings to connect the element pins and corresponding electrical pins; calculating a plurality of bus spacings, wherein each of the bus spacings is between one of the bus paths and adjacent one of the bus paths; adjusting the bus paths according to the bus spacings and a preset distance; and arranging the wirings in each of the adjusted bus paths according to the design information.

9 Claims, 9 Drawing Sheets

(56) References Cited

U.S. PATENT DOCUMENTS

| | | | | |
|---|---|---|---|---|
| 11,281,833 B1 * | 3/2022 | Benedict | ............... | G06F 30/392 |
| 2009/0217230 A1 * | 8/2009 | He | ......................... | G06F 30/398 |
| | | | | 716/129 |
| 2011/0231810 A1 * | 9/2011 | Tanisho | ................ | G06F 30/394 |
| | | | | 716/130 |
| 2012/0254819 A1 * | 10/2012 | Takagi | .................... | G06F 30/30 |
| | | | | 716/126 |
| 2016/0110490 A1 * | 4/2016 | Ding | .................... | G06F 30/394 |
| | | | | 716/126 |
| 2016/0128191 A1 * | 5/2016 | Fukuchi | .............. | G06F 30/3312 |
| | | | | 174/258 |
| 2016/0350467 A1 * | 12/2016 | Zhao | .................... | G06F 30/392 |
| 2019/0258751 A1 * | 8/2019 | Nishio | .................. | G06F 30/394 |
| 2020/0196437 A1 * | 6/2020 | Weng | .................. | H05K 1/0245 |
| 2024/0378364 A1 * | 11/2024 | Shao | .................... | G06F 30/394 |

FOREIGN PATENT DOCUMENTS

| | | |
|---|---|---|
| CN | 110147632 | 8/2019 |
| TW | I599902 | 9/2017 |
| TW | 202024968 | 7/2020 |

* cited by examiner

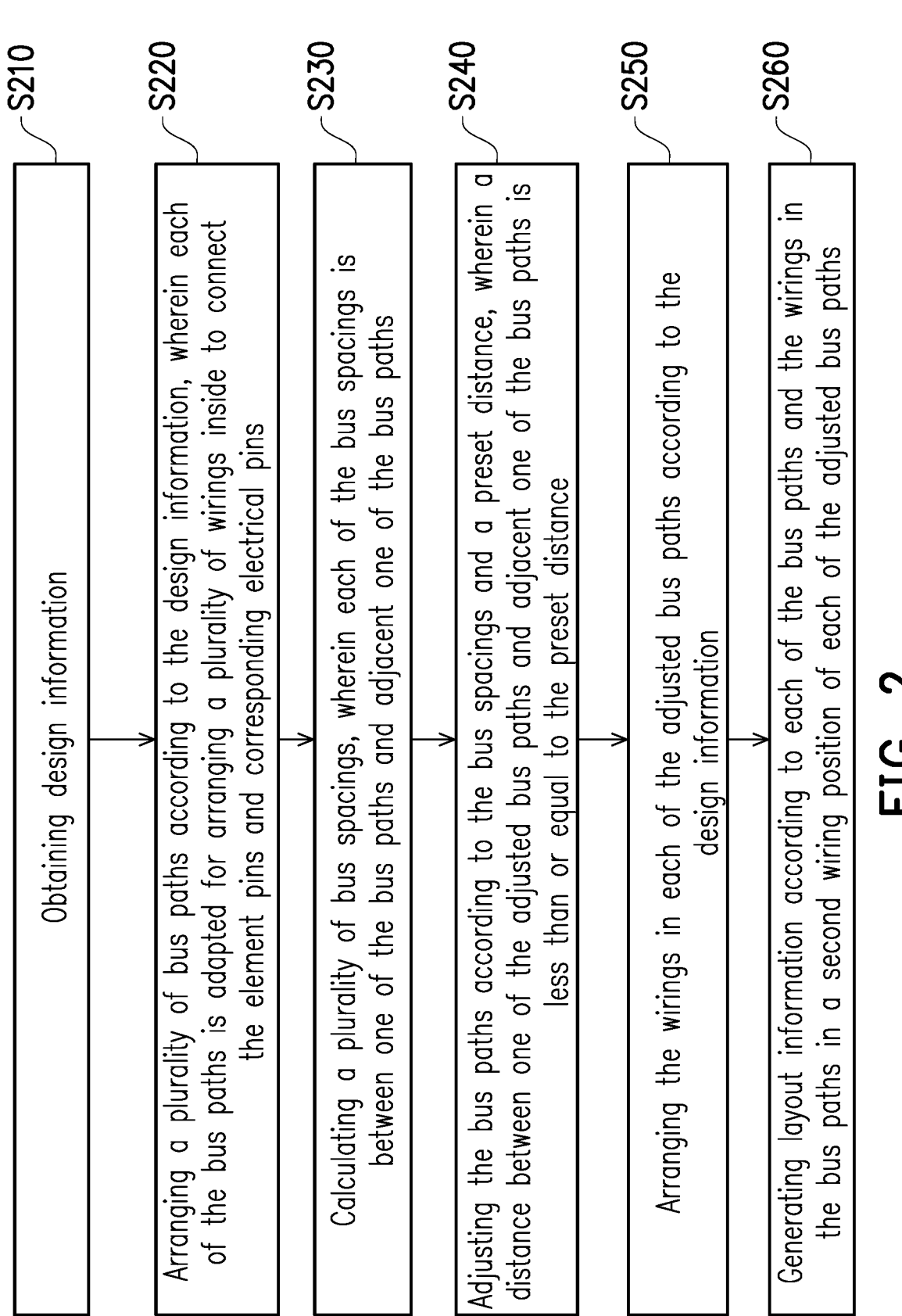

S210

Obtaining design information

S220

Arranging a plurality of bus paths according to the design information, wherein each of the bus paths is adapted for arranging a plurality of wirings inside to connect the element pins and corresponding electrical pins

S230

Calculating a plurality of bus spacings, wherein each of the bus spacings is between one of the bus paths and adjacent one of the bus paths

S240

Adjusting the bus paths according to the bus spacings and a preset distance, wherein a distance between one of the adjusted bus paths and adjacent one of the bus paths is less than or equal to the preset distance

S250

Arranging the wirings in each of the adjusted bus paths according to the design information

S260

Generating layout information according to each of the bus paths and the wirings in the bus paths in a second wiring position of each of the adjusted bus paths

FIG. 2

ROUTING METHOD OF PRINTED CIRCUIT BOARD AND ELECTRONIC DEVICE

CROSS-REFERENCE TO RELATED APPLICATION

This application claims the priority benefit of the U.S. provisional application Ser. No. 63/323,506, filed on Mar. 25, 2022 and the Taiwan application serial no. 111144162, filed on Nov. 18, 2022. The entirety of each of the above-mentioned patent applications is hereby incorporated by reference herein and made a part of this specification.

BACKGROUND

Technical Field

The disclosure relates to a printed circuit board design technology, and more particularly, to a printed circuit board routing method and an electronic device.

Description of Related Art

Conventionally, the routing on a printed circuit board (PCB) relies mainly on manual operations. Routing and planning the route based on the experience of a PCB Layout Engineer is extremely time-consuming. However, due to the increasing replacement rate of consumer electronic devices, the product types are becoming more diversified. In response to the market demand, the internal circuit design inside the electronic device is becoming more subtle and complex, so that the circuit boards is becoming more refined, and this, in turn, increases the difficulty in space planning and routing, resulting in more consumption of time and manpower to complete.

However, the experience gap of PCB Layout Engineers will seriously affect the quality of circuit board design. Although fully automatic routing tools are available in the industry, multiple manual adjustments to the layout are still required according to different design requirements. Accordingly, the PCB Layout Engineers have a diminishing willingness to use the fully automatic routing tools.

SUMMARY

The disclosure relates to a printed circuit board design technology, and more particularly, to a printed circuit board routing method and an electronic device.

The routing method of the printed circuit board of the embodiment of the disclosure is described below. Design information is obtained. The design information includes multiple element pins of at least one circuit element and multiple electrical pins on the printed circuit board. Multiple bus paths are arranged according to the design information. Each of the bus paths is adapted for arranging multiple wirings to connect the element pins and corresponding electrical pins. Bus spacings are calculated, wherein each of the bus spacings is between one of the bus paths and adjacent one of the bus paths. The bus paths are adjusted according to the bus spacings and a preset distance. A distance between one of the adjusted bus paths and adjacent one of the bus paths is less than or equal to the preset distance. The wirings are arranged in each of the adjusted bus paths according to the design information.

The electronic device of the embodiment of the disclosure includes a processor and a memory device. The memory device is coupled to the processor. The memory device includes design information, the design information includes multiple element pins of at least one circuit element and multiple electrical pins on a printed circuit board. The processor obtains the design information through the memory device and arranges multiple bus paths according to the design information, each of the bus paths is adapted for arranging multiple wirings to connect the element pins and corresponding electrical pins. The processor calculates multiple bus spacings, wherein each of the bus spacings is between one of the bus paths and adjacent one of the bus paths, and adjusts the bus paths according to the bus spacings and a preset distance. A distance between one of the adjusted bus paths and adjacent one of the bus paths is less than or equal to the preset distance. The processor arranges the wirings in each of the adjusted bus paths according to the design information.

Based on the above, the routing method of the printed circuit board and the electronic device of the disclosure divide the routing method into three stages: the preliminary layout of the bus path, the adjustment of the bus path, and the automatic routing of the wiring in the bus path. The preliminary layout and automatic routing of the bus path are realized by computer hardware and corresponding software algorithms, thereby reducing the time and difficulty of manually planning the routing of the printed circuit board and bringing the routing result closer to the completion of manual routing.

BRIEF DESCRIPTION OF THE DRAWINGS

FIG. 2 is a flow chart of a routing method of a printed circuit board according to an embodiment of the disclosure.

DESCRIPTION OF THE EMBODIMENTS

The embodiments of the disclosure mainly divide the routing method into three stages: the preliminary layout of the bus path, the adjustment of the bus path, and the automatic routing of the wiring in the bus path. In addition, the preliminary layout and automatic routing of the bus path are mainly realized by computer hardware and corresponding software algorithms. The step of the adjustment of bus path is adjusted by the printed circuit board (PCB) Layout Engineers. After realizing through computer hardware combined with artificial intelligence algorithms, it is reviewed and adjusted by the PCB Layout Engineers again, thereby reducing the time and difficulty of manually planning the routing of the printed circuit board and bringing the routing result closer to the completion of manual routing. In this way, the fully automatic routing tool and manual routing may make up for each other's deficiencies. Moreover, the embodiment of the disclosure adopts the method of arranging of the bus path first and then arranging of the wiring in the bus path, which imitates the flow of manual work.

In other words, the embodiment of the disclosure may use computer hardware to perform highly repetitive work in the first stage and third stage to ensure that the design speed is improved. In addition, the results of the arrangement of the first stage are adjusted through computer hardware combined with algorithms or manually in the second stage. The experience of the PCB Layout Engineers is used to adjust the possible design errors or design quality of the fully automatic routing tool, thereby ensuring the subsequent results is closer to the result and the completion rate of manual layout. The following detailed description conforms to each embodiment of disclosure.

Figure 1:
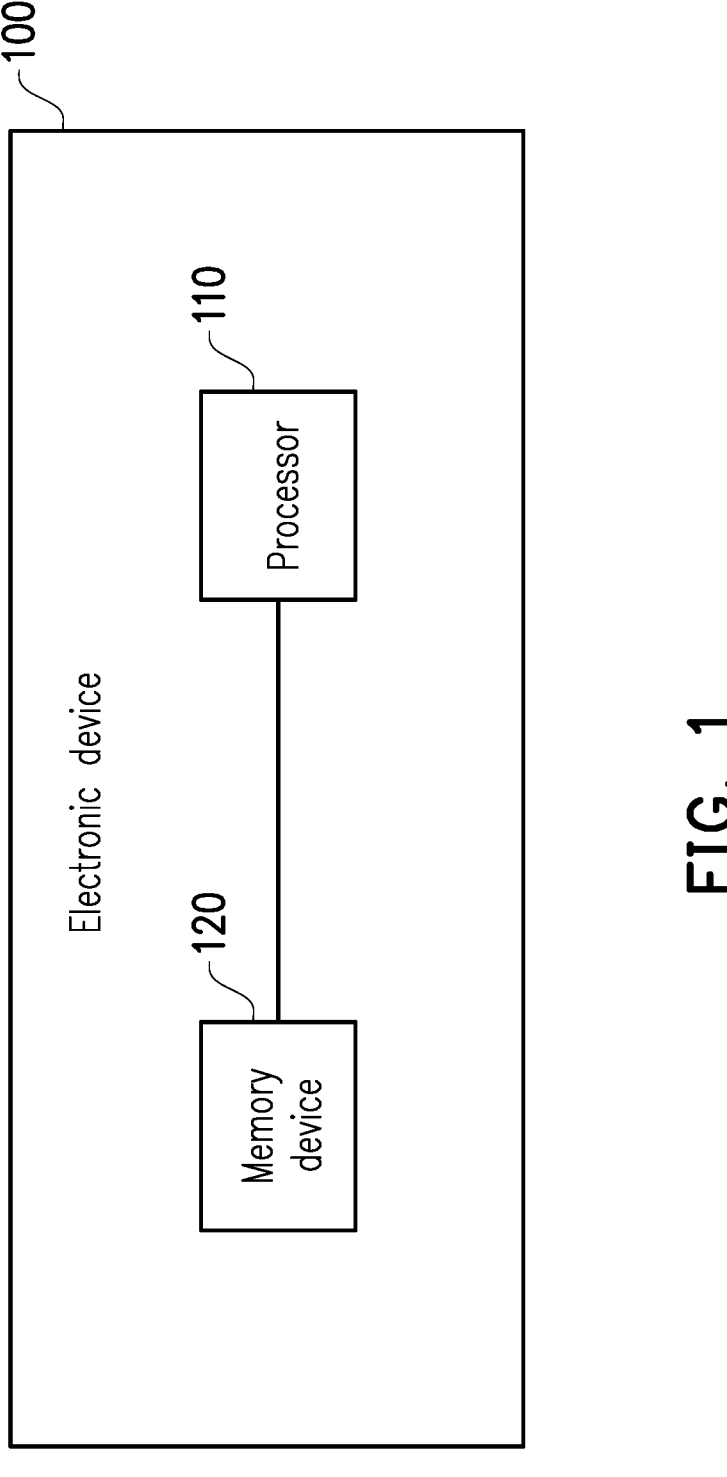
FIG. 1 is a schematic view of an electronic device according to an embodiment of the disclosure.

FIG. 1 is a schematic view of an electronic device according to an embodiment of the disclosure. The electronic device 100 includes a processor 110 and a memory device 120. The memory device 120 is coupled to the processor 110. The memory device 120 of this embodiment may include software and firmware for realizing each of the steps in FIG. 2. The processor 110 may execute corresponding algorithms through the software and the firmware in the memory device 120, so as to realize each of the steps described in FIG. 2.

The memory device 120 of this embodiment includes design information corresponding to the printed circuit board. The design information is relevant information required to design routing on a printed circuit board. In this embodiment, the design information may at least include multiple element pins of at least one circuit element and multiple electrical pins on the printed circuit board. Specifically, prior to routing, pre-work is required to convert the relevant information of the printed circuit board into the format required by the software executed by the processor 110. The information includes, for example, length, width, height, number of layers of the printed circuit board, position of the circuit element on the printed circuit board, position of obstacle (e.g., a via), position of the electrical pins, etc. The circuit element of this embodiment may be an integrated circuit element with a ball grid array (BGA), or a passive circuit element (i.e., resistors, capacitors, inductors, etc.). The electrical pin of this embodiment is an example of a dual in-line memory module (DIMM) pin.

The processor 110 of this embodiment obtains the design information through the memory device 120, and arrange multiple bus paths according to the design information. Each of the bus path is adapted for arranging multiple wirings to connect the element pins and corresponding electrical pins. The processor 110 calculates multiple bus spacings, wherein each of the bus spacings is between one of the bus paths and adjacent one of the bus paths, and adjusts the bus paths according to the bus spacings and a preset distance. In addition, a distance between one of the adjusted bus paths and adjacent one of the bus paths is less than or equal to the preset distance. The processor 110 arranges the wirings in each of the adjusted bus paths according to the design information. Moreover, the processor 110 may also generate layout information according to the bus paths and the wirings. The manufacturing apparatus of the printed circuit board may produce the printed circuit board conforming to the aforementioned layout information. The detailed operation of the aforementioned embodiment described below.

FIG. 2 is a flow chart of a routing method of a printed circuit board according to an embodiment of the disclosure. Each of the steps described in FIG. 2 is realized by the electronic device 100 in FIG. 1.

In step S210, the processor 110 obtains the design information of the printed circuit board from the memory device 120. Alternatively, the processor 110 in step S210 may define the design information of the printed circuit board through corresponding information (e.g., manually input information, default information of the printed circuit board obtained through a database or other sources, etc.). The design information mainly includes the positions of the element pins of the at least one circuit element on the printed circuit board and the positions of the electrical pins on the printed circuit board (e.g., the pin information in Table 1). The design information may also include the position of at least one obstacle disposed on the printed circuit board; the connection relationship of each of the wrings from the element pins of the circuit element to the corresponding electrical pins (e.g., the pin connection relationship in Table 1) in the bus paths; the width information of each of the bus paths; the priorities of each of the bus paths (e.g., the priority in Table 1); the bus name information of each of the bus paths; line width and line spacing information, etc. The line width and line spacing information include multiple line widths of each of the wirings in the bus path, and multiple line spacings must be maintained between each of the wirings and adjacent wirings. The line spacing information (Line_spacing) refers to the minimum distance to be kept between a wiring and the adjacent wirings.

An example of the design information is shown in Table 1:

TABLE 1

| Data content | Data format |
|---|---|
| Pin information | Pin_name: [Pin_location, Pin_padstack, Pin_size] |
| Pin connection relationship | Net_name: [Pin_name1, Pin_name2] |
| Priority and bus name information | Bus_name: [Bus_priority, Net_name1, Net_name2, . . . ] |
| Line width and line spacing information | Net_name: [Line_width, Line_spacing] |

In step S220, the processor 110 in FIG. 1 arranges multiple bus paths according to the aforementioned design information, and each of the bus paths is adapted for arranging multiple wirings to connect the element pins and corresponding electrical pins. That is, this embodiment uses the step S220 in FIG. 2 to carry out the preliminary layout of the bus path.

Specifically, the processor 110 sums up the line widths of the wirings and the line spacings between the wirings in each of the bus paths to obtain width information of each of the bus paths. Moreover, the processor 110 may arrange the bus paths according to the width information of the bus paths based on the corresponding software algorithm of the fully automatic routing tool. Besides, in step S220, the processor 110 may set the target of the corresponding software algorithm of the fully automatic routing tool to the shortest length of the bus path. In some embodiments, the width information of the bus path is also pre-calculated and placed in the design information, such as the bus width information in Table 2 below.

Figure 3A:
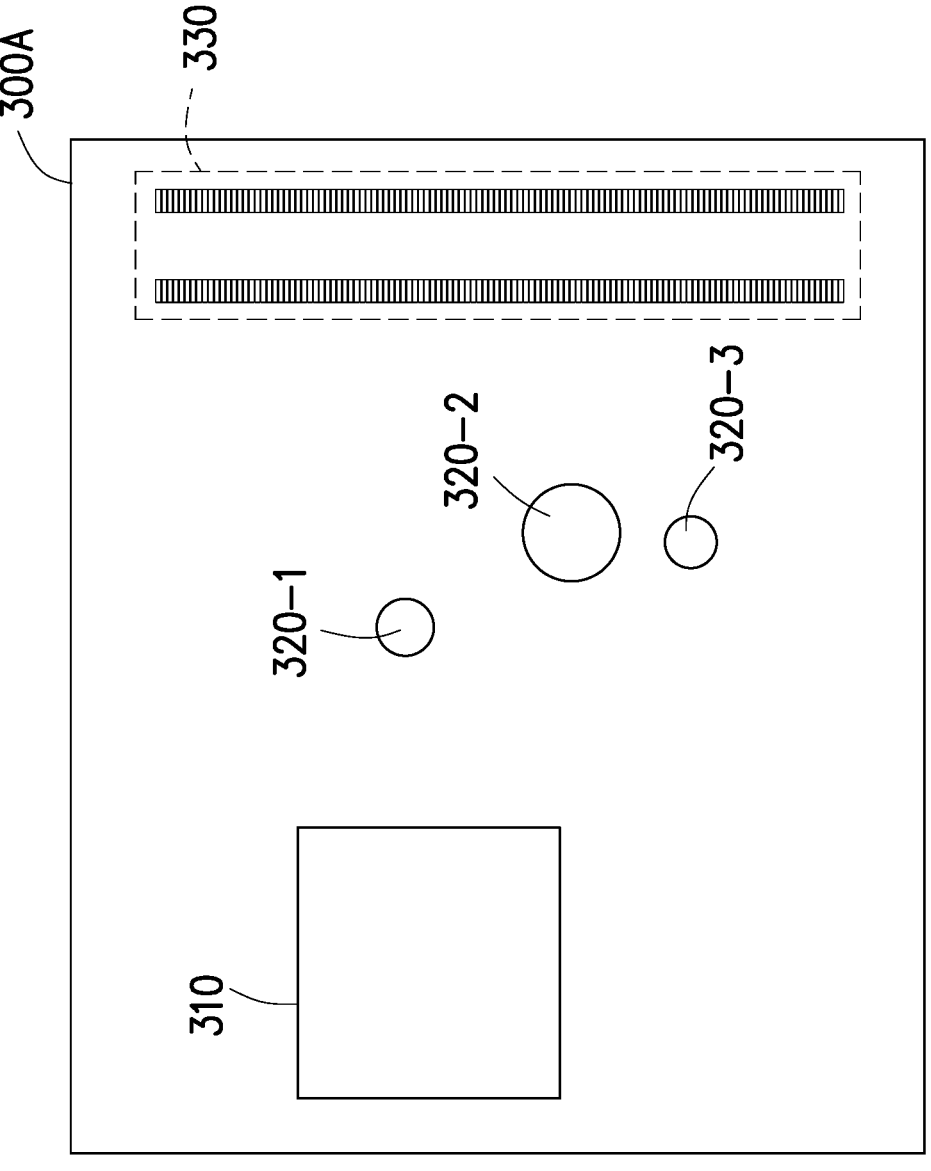
FIG. 3A to FIG. 3C are schematic views of routing corresponding to step S220 in FIG. 2 according to an embodiment of the disclosure.
Figure 3B:
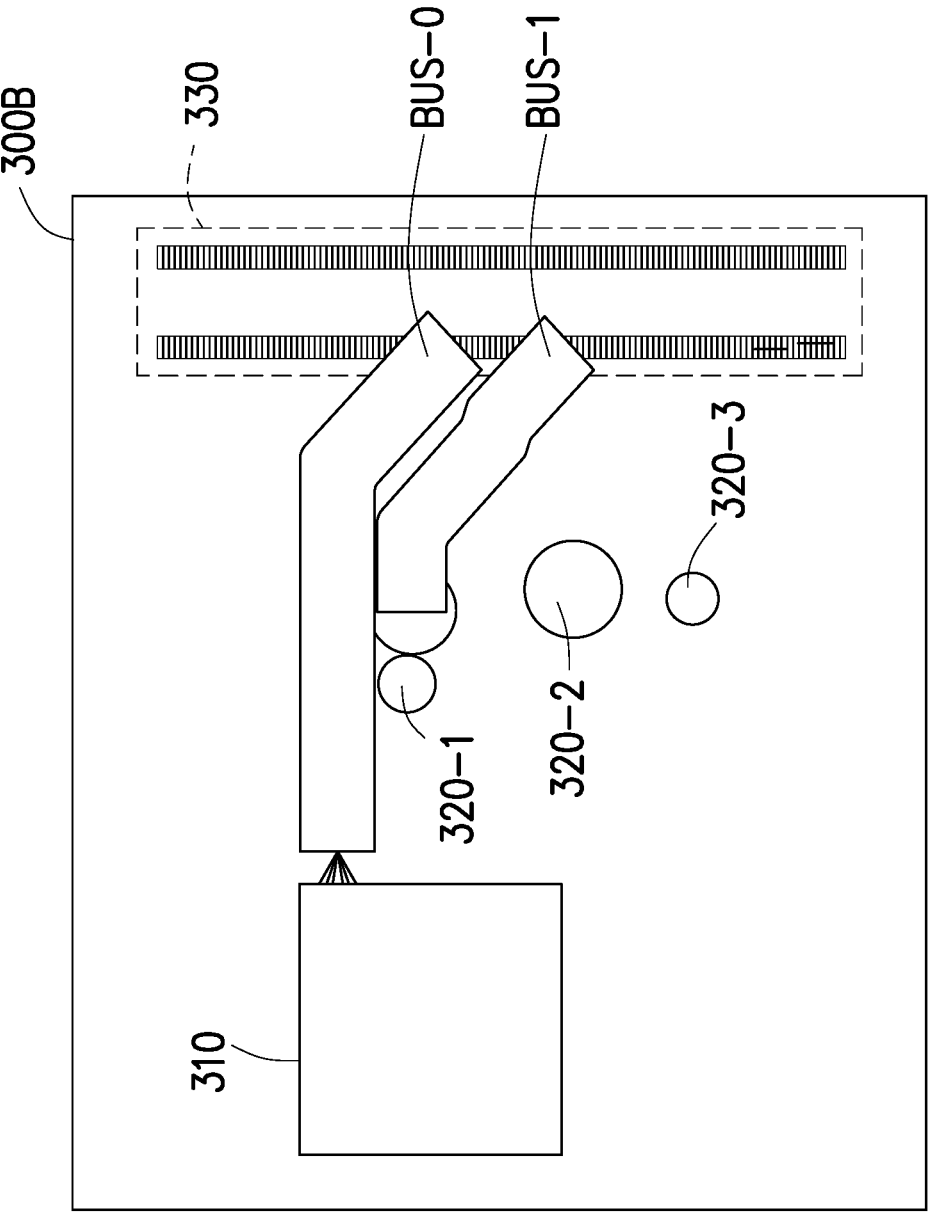
Figure 3C:
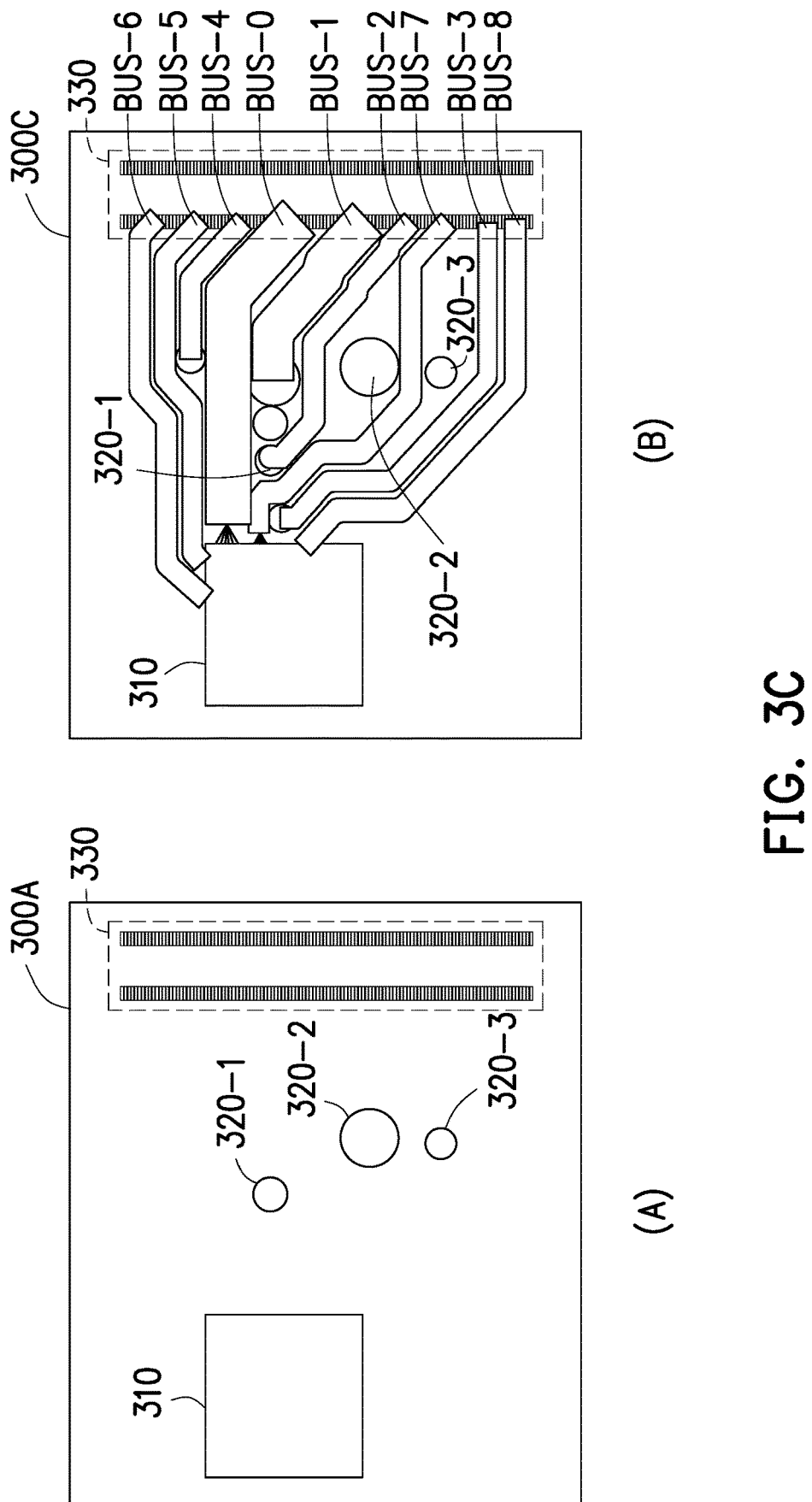

FIG. 3A to FIG. 3C are schematic views of routing corresponding to step S220 in FIG. 2 according to an embodiment of the disclosure. FIG. 3A mainly presents a virtual printed circuit board 300A and objects located on the virtual printed circuit board 300A, such as a circuit element 310, an obstacle 320-1, an obstacle 320-2, an obstacle 320-3, and electrical pins 330. The circuit element 310 of this embodiment is an integrated circuit element with a ball grid array (BGA), the obstacles 320-1~320-3 are a via area on the virtual printed circuit board 300A or a non-conductive object, and the electrical pins 330 is an example of a dual in-line memory module (DIMM) pins 330. A part of the bus paths in this embodiment connects the element pins of the circuit element 310 to a part of the electrical pins 330, another part of the bus paths is connected to another part of the electrical pins 330 through a preset via area (not the aforementioned obstacles 320-1~320-3). The area of the virtual printed circuit board 300A that is not configured with the elements 310, 320-1~320-3, and 330 is the space for arranging of the bus path.

The bus paths of this embodiment further have respective priorities. The priority of the bus path is set based on parameters such as the importance of the bus path to the signal transmitted in the entire printed circuit board, the signal quality maintenance rate, etc. This embodiment arranges the bus paths orderly according to the priorities of each of the bus paths. This embodiment takes 9 bus paths BUS-0 to BUS-8 as an example, and the priorities of bus paths BUS-0 to BUS-8 are also arranged orderly.

In FIG. 3B, two bus paths BUS-0 and BUS-1 are first presented for illustration. Both of the bus path BUS-0 and the bus path BUS-1 have corresponding width information (289 mils in this embodiment). The priority of the bus path BUS-0 is higher than that of the bus path BUS-1 and other bus paths, so the processor 110 first routes the bus path BUS-0. Next, the processor 110 continues to route the bus path BUS-1 as shown in FIG. 3B. Thus, this embodiment routes the bus paths BUS-0 to BUS-8 orderly as shown in the right half (B) of FIG. 3C.

The left half of FIG. 3C (A) presents the virtual printed circuit board 300A without bus paths BUS-0 to BUS-8, and the right half of FIG. 3C (B) presents the virtual printed circuit board 300C with the bus paths BUS-0 to BUS-8. The width information of the bus path BUS-0 and the BUS-1 of this embodiment is 289 mil, the width information of the bus path BUS-2, and the BUS-4~BUS-8 is 136.5 mil, and the width information of the bus path BUS-3 is 122 mil. The right half (B) of FIG. 3C is the preliminary wiring diagram of the embodiment of the disclosure.

As shown in the right part (B) of FIG. 3C, a large space is still available in the middle of bus path BUS-0 to BUS-8, so the space on the printed circuit board has not been effectively utilized. Thus, the embodiment of the disclosure hopes to adjust the aforementioned wiring diagram based on the experience of the PCB Layout Engineers, so as to use the space more effectively.

In step S230, multiple bus spacings are calculated, wherein each of the bus spacings is between one of the bus paths and adjacent one of the bus paths. In step S240, the aforementioned bus path is adjusted according to the bus spacing calculated in step S230 and a preset distance. The distance between one of the adjusted bus paths and adjacent one of the bus paths is less than or equal to the preset distance. In response to the design information further including the positions of the obstacles, step S230 further calculates multiple obstacle pitches, wherein each of the obstacle pitches is between one of the obstacles and one of the bus paths adjacent to the obstacles, and adjusts the bus paths according to the obstacle pitches and the preset distance in step S240. The distance between one of the obstacles and one of the adjusted bus paths adjacent to the obstacles is less than or equal to the aforementioned preset distance. In other words, this embodiment measures the distance between each of the line segments of two adjacent bus paths as the aforementioned bus spacing, and measures whether there is an obstacle within this distance and the distance between each of the line segments and the obstacle as the aforementioned obstacle pitch. The comparison result between the bus spacing and the aforementioned preset distance and the comparison result between the obstacle pitch and the aforementioned preset distance is used to adjust the position of the bus path. In response to the measured pitch being greater than the preset distance (e.g., 50 mil), wasted space is provided between the two adjacent bus paths. At this time, the PCB Layout Engineers adjusts one of the bus paths to make it close to the other bus path or obstacle to fill the spaces.

Step S230 and step S240 of this embodiment is realized by adjustments made by PCB Layout Engineers, or by computer hardware combined with artificial intelligence algorithms. Alternatively, step S230 and step S240 is first implemented through computer hardware combined with artificial intelligence algorithms, and then the PCB Layout Engineers review and adjust the bus paths adjusted again, thereby reducing the time and difficulty of manually planning the routing of the printed circuit board.

FIG. 4A to FIG. 4D are views of routing corresponding to step S230 in FIG. 2 according to an embodiment of the disclosure. This embodiment starts from the bus path BUS-0 with the highest priority in the wiring diagram 400A. Next, the bus path BUS-1, the bus path BUS-2, the bus path BUS-7, the bus path BUS-3, and the bus path BUS-8 are checked downwards according to the order. After finishing checking, the bus path BUS-4, the bus path BUS-5, and the bus path BUS-6 are checked upwards according to the order.

Figure 4A:
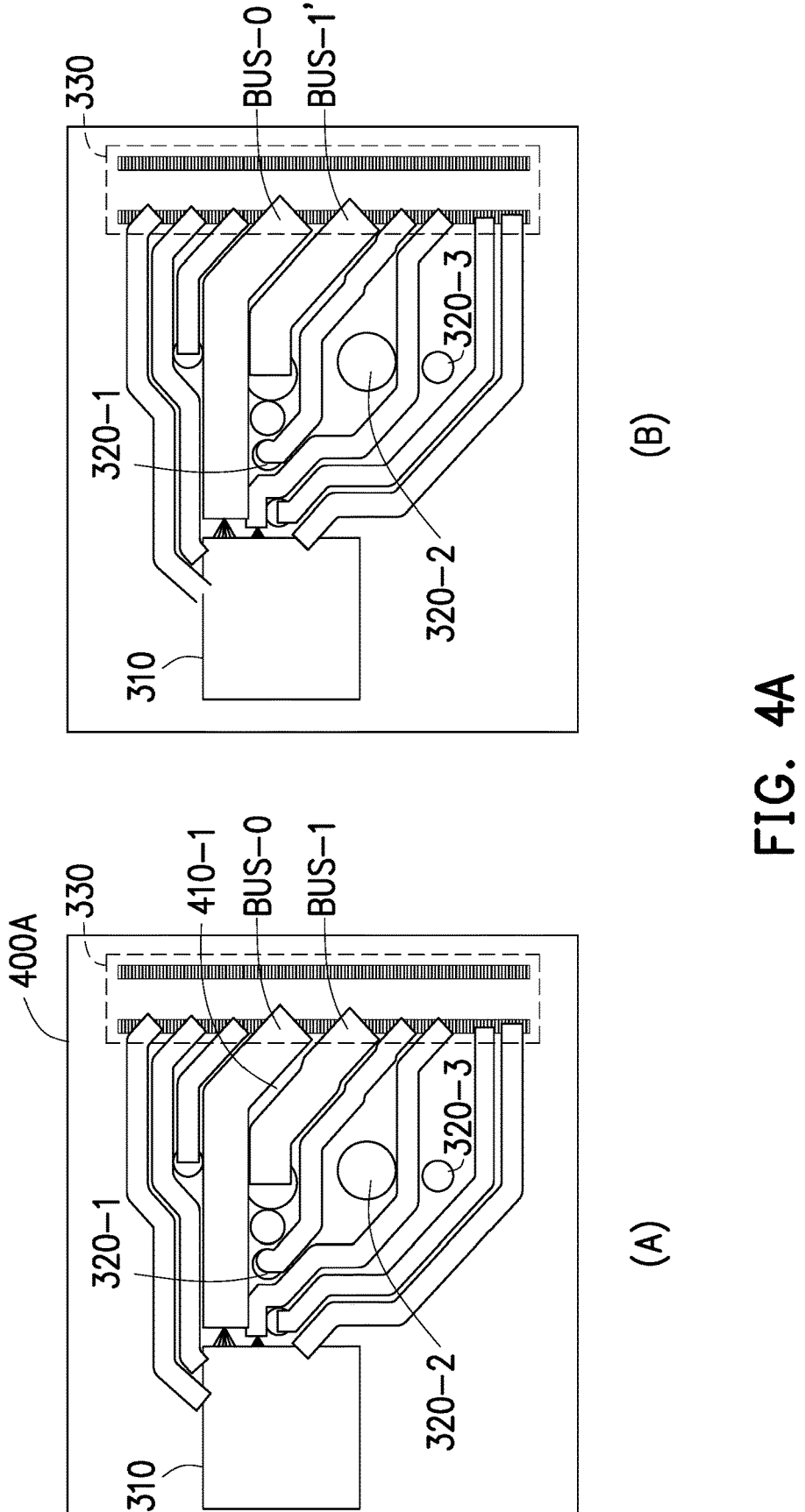
FIG. 4A to FIG. 4D are schematic views of routing corresponding to step S230 in FIG. 2 according to an embodiment of the disclosure.

In the left half (A) of FIG. 4A, by calculating the pitch between the bus path BUS-0 and the bus path BUS-1 in the wiring diagram 400A, it is judged whether the preset distance is exceeded, and an available space 410-1 is found. Thus, the routing space is saved by adjusting the bus path (e.g., the bus path BUS-1' in the right half (B) of FIG. 4A) to be closer to the bus path BUS-0.

Figure 4B:
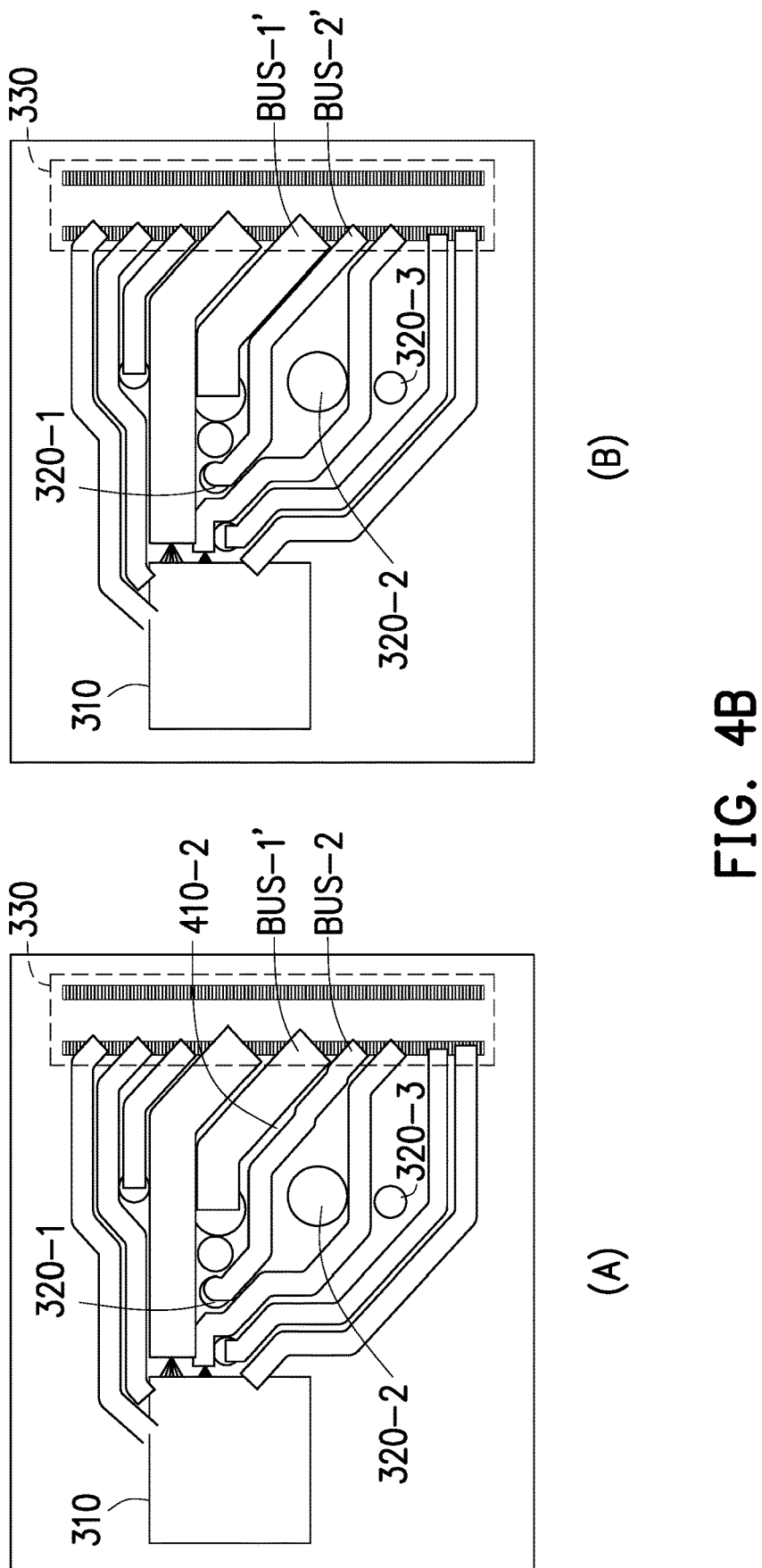

Then, in the left half (A) of FIG. 4B, by calculating the pitch between the bus path BUS-1' and the bus path BUS-2, it is judged whether the preset distance is exceeded, and an available space 410-2 is found. Thus, the routing space is saved by adjusting the bus path (e.g., the bus path BUS-2' in the right half (B) of FIG. 4B) to be closer to the bus path BUS-1'.

Figure 4C:
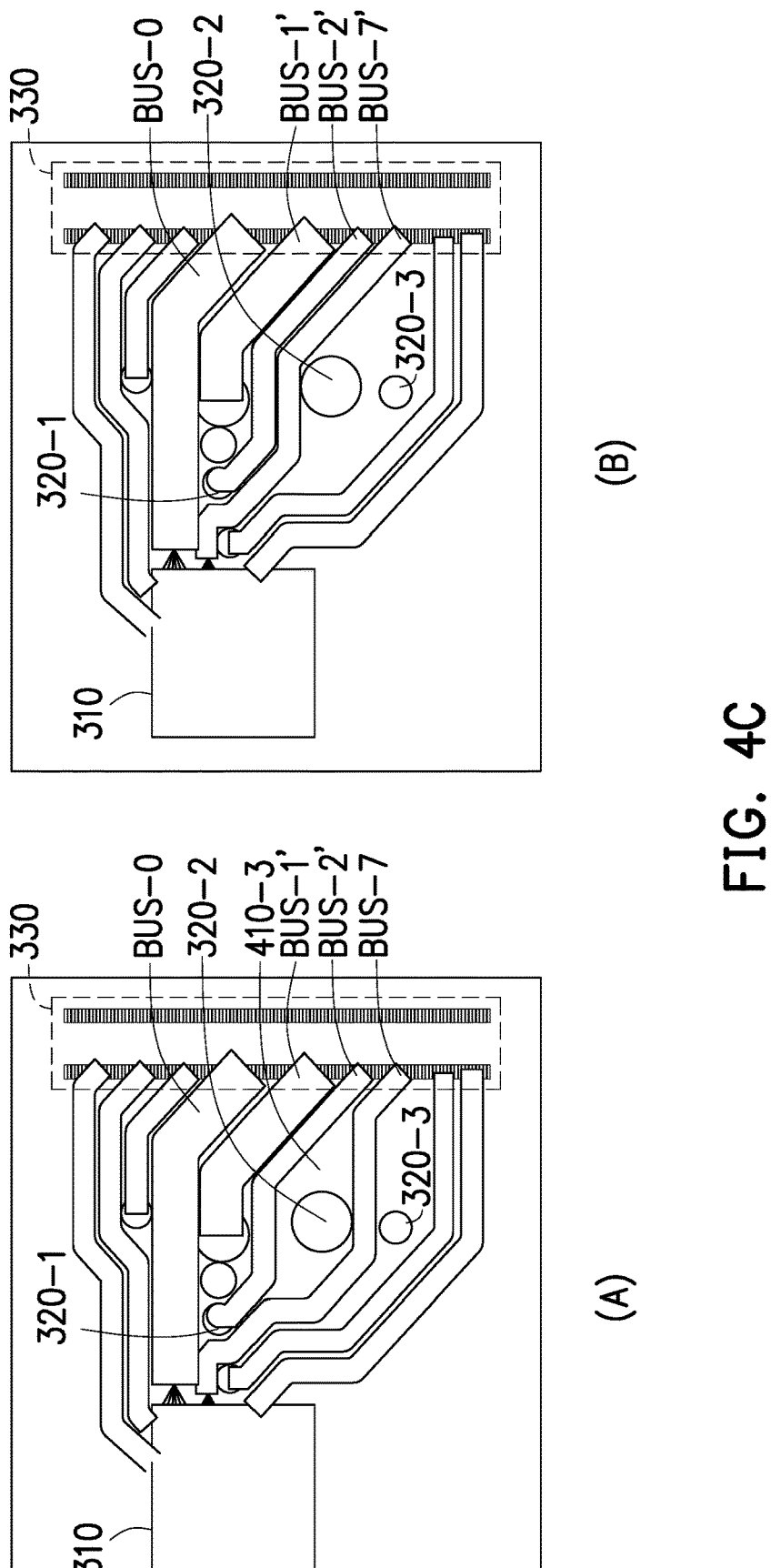

Moreover, in the left half (A) of FIG. 4C, an obstacle 320-2 is provided between the bus path BUS-2' and the bus path BUS-7. Thus, by calculating the bus spacing between the bus path BUS-2' and the bus path BUS-7 and the obstacle pitches between the bus path BUS-2', the bus path BUS-7, and the obstacle 320-2, it is judged whether the preset distance is exceeded, and an available space 410-3 is found. Thus, the routing space is saved by adjusting the bus path (e.g., the bus path BUS-7' in the right half (B) of FIG. 4C) to be closer to the bus path BUS-2' or even by making the bus path BUS-7' bypass the obstacle 320-2.

Figure 4D:
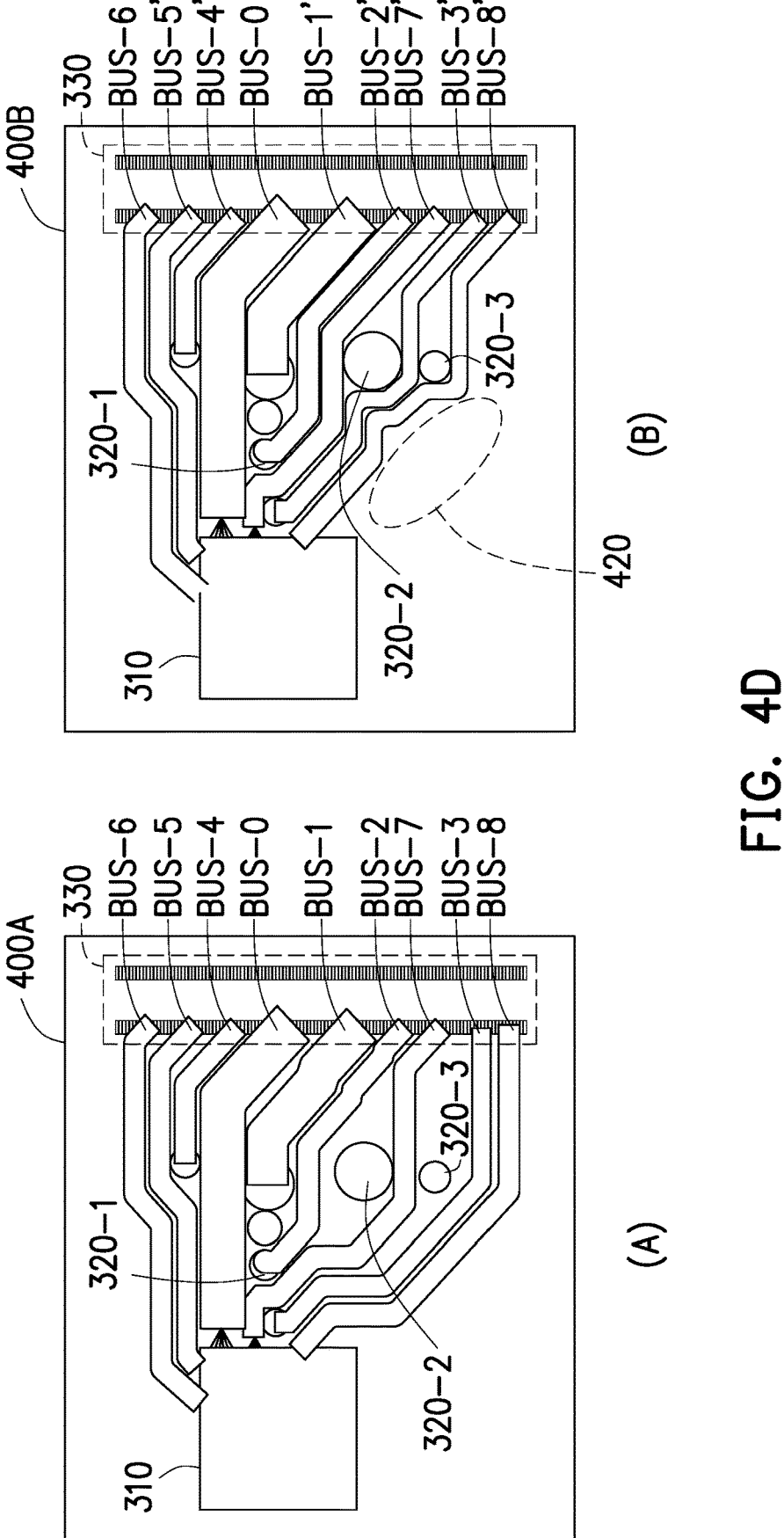

By analogy, the left half (A) of FIG. 4D presents the preliminary wiring diagram 400A, and the right half (B) of FIG. 4D presents the wiring diagram 400B adjusted by step S230 and step S240. Except for the bus path BUS-0 and the bus path BUS-6, the bus path BUS-1'~BUS-5' and the bus path BUS-7'~BUS-8' have all been adjusted, so a saved space 420 is obtained. Thus, through the adjustment of step S230 and step S240 in FIG. 2, the interval between the bus paths is reduced, thereby improving space utilization. The processor 110 in FIG. 1 obtains the information of the wiring diagram 400B adjusted to continue the other steps in FIG. 2.

Returning to FIG. 2, in step S250, the processor 110 in FIG. 1 arranges the wirings in each of the adjusted bus paths based on the aforementioned design information. In addition to the requirement that each of the wirings must complete point-to-point winding within the own bus path thereof, there are also requirements for the width of the line segment (referred to as line width), the distance between adjacent segments (referred to as line spacing), and the length limitation of the entire wiring (e.g., wiring length limit information in Table 2).

In this embodiment, in addition to the information shown in Table 1, examples of design information may also have the information shown in Table 2:

TABLE 2

| Data content | Data format |
| --- | --- |
| Bus width information | Bus_name: [bus_width] |
| Wiring length limit information | Net_name: [Min_length, Max_length] |

In step S260, the processor 110 in FIG. 1 may also generate layout information according to the bus paths adjusted and the wirings in the bus paths. The layout information is read by a manufacturing apparatus of the printed circuit board, and the manufacturing apparatus of the printed circuit board is ready for producing the printed circuit board conforming to the aforementioned layout information.

To sum up, the routing method of the printed circuit board and the electronic device of the disclosure divide the routing method into three stages: the preliminary layout of the bus path, the adjustment of the bus path, and the automatic routing of the wiring in the bus path. The preliminary layout and automatic routing of the bus path are realized by computer hardware and corresponding software algorithms, thereby reducing the time and difficulty of manually planning the routing of the printed circuit board and bringing the routing result closer to the completion of manual routing.

What is claimed is:

1. A routing method for a printed circuit board, comprising:

obtaining design information, wherein the design information comprises a plurality of element pins of at least one circuit element, a plurality of electrical pins on the printed circuit board and at least one obstacle;

arranging a plurality of bus paths according to the design information, wherein each of the bus paths is adapted for arranging a plurality of wirings to connect the element pins and corresponding electrical pins;

calculating a plurality of bus spacings, wherein each of the bus spacings is between one of the bus paths and adjacent one of the bus paths;

calculating a plurality of obstacle pitches, wherein each of the obstacle pitches is between the obstacle and one of the bus paths adjacent to the obstacle;

adjusting the bus paths according to the bus spacings and a preset distance, wherein a distance between one of the adjusted bus paths and adjacent one of the bus paths is less than or equal to the preset distance;

adjusting the bus paths according to the obstacle pitches and the preset distance, wherein a distance between the obstacle and one of the adjusted bus paths adjacent to the obstacle is less than or equal to the preset distance; and arranging the wirings in each of the adjusted bus paths according to the design information.

2. The routing method according to claim 1, wherein the design information further comprises a plurality of line widths of the wirings and a plurality of line spacings, wherein each of the line spacings is between one of the wirings and adjacent one of the wirings, and arranging the bus paths according to the design information comprises:

summing up the line widths of the wirings and the line spacings between the wirings in each of the bus paths to obtain width information of each of the bus paths; and arranging the bus paths according to the width information of the bus paths.

3. The routing method according to claim 1, wherein the design information further comprises a plurality of priorities, each of the priorities corresponds to each of the bus paths, and arranging the bus paths according to the design information comprises:

arranging the bus paths orderly based on respective priorities of each of the bus paths.

4. The routing method according to claim 3, wherein adjusting the bus paths comprising: adjusting the bus paths orderly based on the respective priorities and orders of each of the bus paths.

5. The routing method according to claim 1, wherein the design information further comprises a connection relationship of each of the wrings from the element pins of the at least one circuit element to the corresponding electrical pins in the bus paths.

6. An electronic device, comprising:

a processor; and a memory device, coupled to the processor, wherein the memory device comprises design information, the design information comprises a plurality of element pins of at least one circuit element, a plurality of electrical pins on a printed circuit board and at least one obstacle, wherein the processor obtains the design information through the memory device and arranges a plurality of bus paths according to the design information, each of the bus paths is adapted for arranging a plurality of wirings to connect the element pins and corresponding electrical pins, the processor calculates a plurality of bus spacings, wherein each of the bus spacings is between one of the bus paths and adjacent one of the bus paths, calculates a plurality of obstacle pitches, wherein each of the obstacle pitches is between the obstacle and one of the bus paths adjacent to the obstacle, adjusts the bus paths according to the bus spacings and a preset distance, wherein a distance between one of the adjusted bus paths and adjacent one of the bus paths is less than or equal to the preset distance, and adjusts the bus paths according to the obstacle pitches and the preset distance, wherein a distance between the obstacle and one of the adjusted bus paths adjacent to the obstacle is less than or equal to the preset distance, and the processor arranges the wirings in each of the adjusted bus paths according to the design information.

7. The electronic device according to claim 6, wherein the design information further comprises a plurality of line widths of the wirings and a plurality of line spacings, wherein each of the line spacings is between one of the wirings and adjacent one of the wirings, the processor sums up the line widths of the wirings and the line spacings between the wirings in each of the bus paths to obtain width information of each of the bus paths, and the processor arranges the bus paths according to the width information of the bus paths.

8. The electronic device according to claim 7, wherein the design information further comprises a plurality of priorities, each of the priorities corresponds to each of the bus paths, the processor arranges the bus paths orderly based on respective priorities of each of the bus paths.

9. The electronic device according to claim 6, wherein the design information further comprises a connection relationship of each of the wrings from the element pins of the at least one circuit element to the corresponding electrical pins in the bus paths.

\* \* \* \* \*